United States Patent [19]
Sutterlin et al.

[11] Patent Number: 5,148,144
[45] Date of Patent: Sep. 15, 1992

[54] DATA COMMUNICATION NETWORK PROVIDING POWER AND MESSAGE INFORMATION

[75] Inventors: Philip H. Sutterlin, San Jose; William R. Bemiss, San Mateo; G. Michael Hey, Palo Alto, all of Calif.

[73] Assignee: Echelon Systems Corporation, Palo Alto, Calif.

[21] Appl. No.: 678,525

[22] Filed: Mar. 28, 1991

[51] Int. Cl.$^5$ .................................. H04M 11/04
[52] U.S. Cl. ......................... 340/310 A; 375/36
[58] Field of Search ........ 340/310 A, 310 R, 310 CP; 375/36

[56] References Cited

U.S. PATENT DOCUMENTS 4,788,448 11/1988 Crowe .................. 340/310 A
5,032,819 7/1991 Sakuragi et al. ............. 340/310 A
5,065,133 11/1991 Howard ................... 340/310 A

*Primary Examiner*—Jin F. Ng
*Assistant Examiner*—Nina Tong
*Attorney, Agent, or Firm*—Blakely, Sokoloff, Taylor & Zafman

[57] ABSTRACT

A data communications network for delivering power and communications over the same cable bundle includes a plurality of communications nodes wherein associated with each of the nodes is a transformer having a core, a primary winding and a secondary winding. The secondary winding has a centertap connection which either splits or merges the current in the secondary winding to eliminate net DC flux within the transformer. A DC/DC converter is also included for transforming the relatively high DC voltage of the cable down to a regulated supply potential for use by that node. The converter is coupled between the centertap of the transformer and the cable bundle. A power source provides the DC voltage distributed across the network and is coupled to the cable bundle via a centertap connection of another winding.

14 Claims, 6 Drawing Sheets

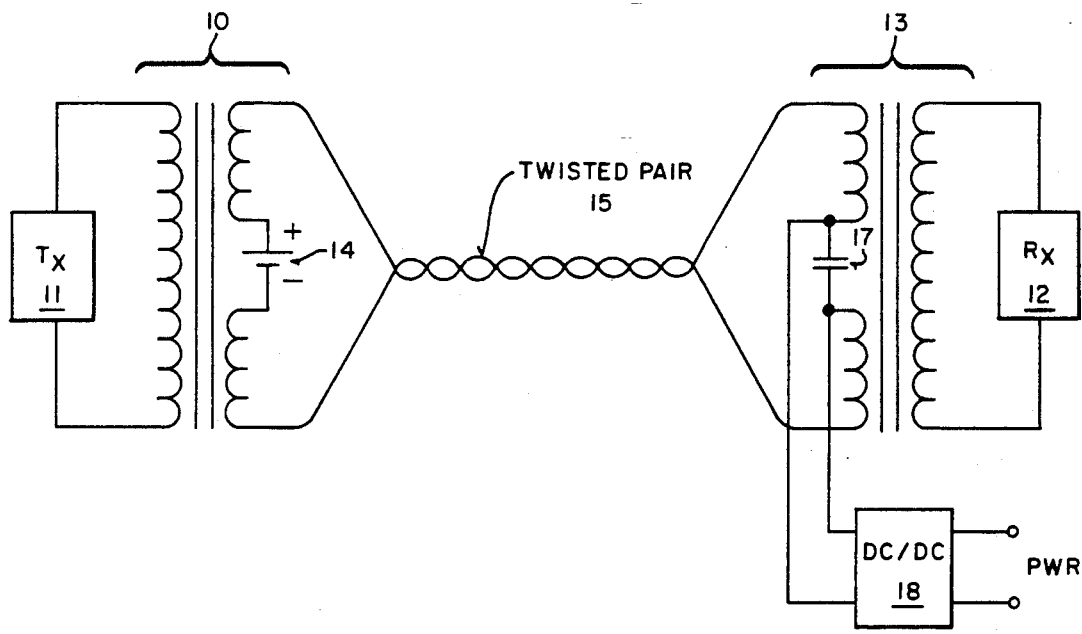
FIG_1 (PRIOR ART)
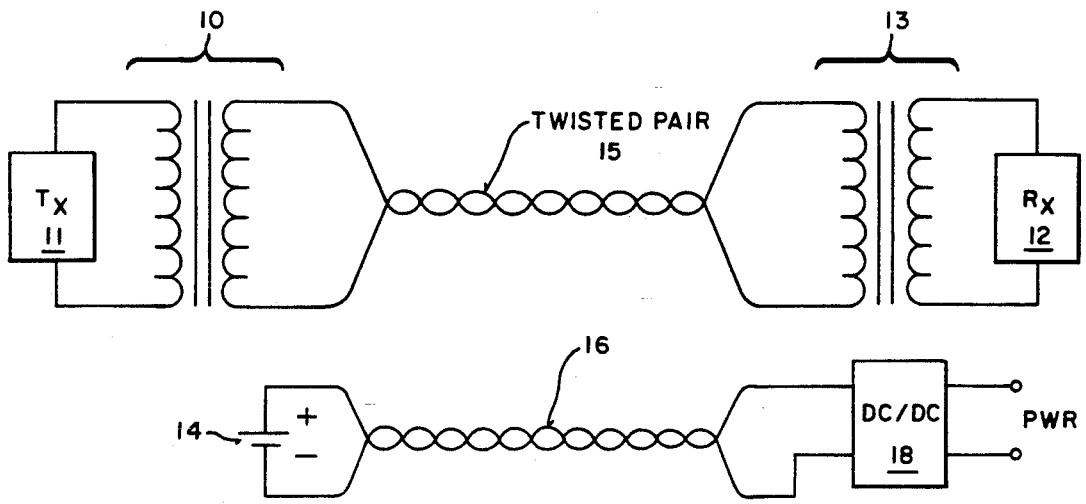
FIG_2 (PRIOR ART)

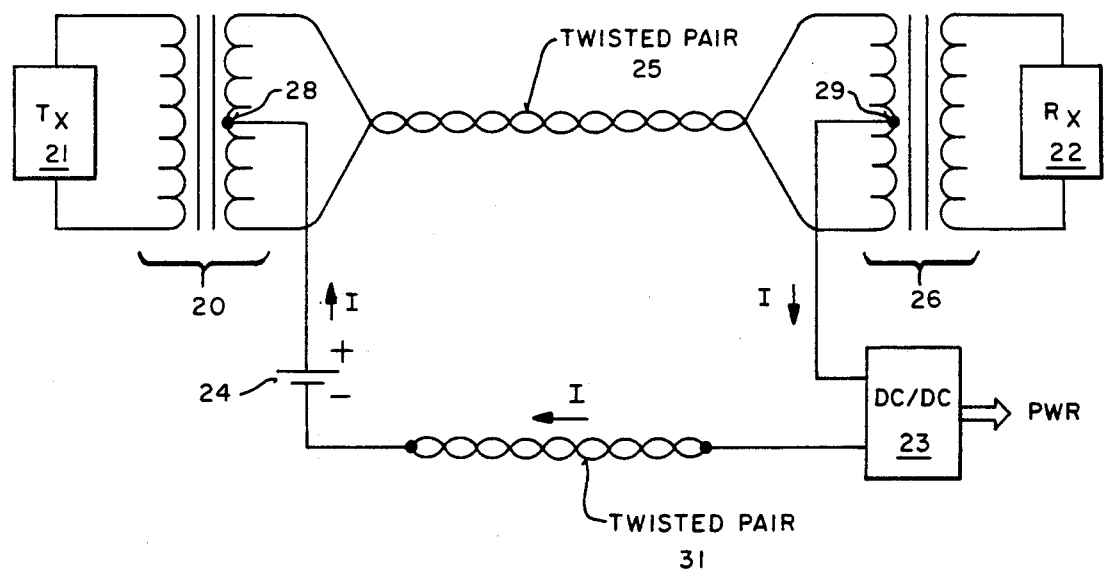
FIG_3
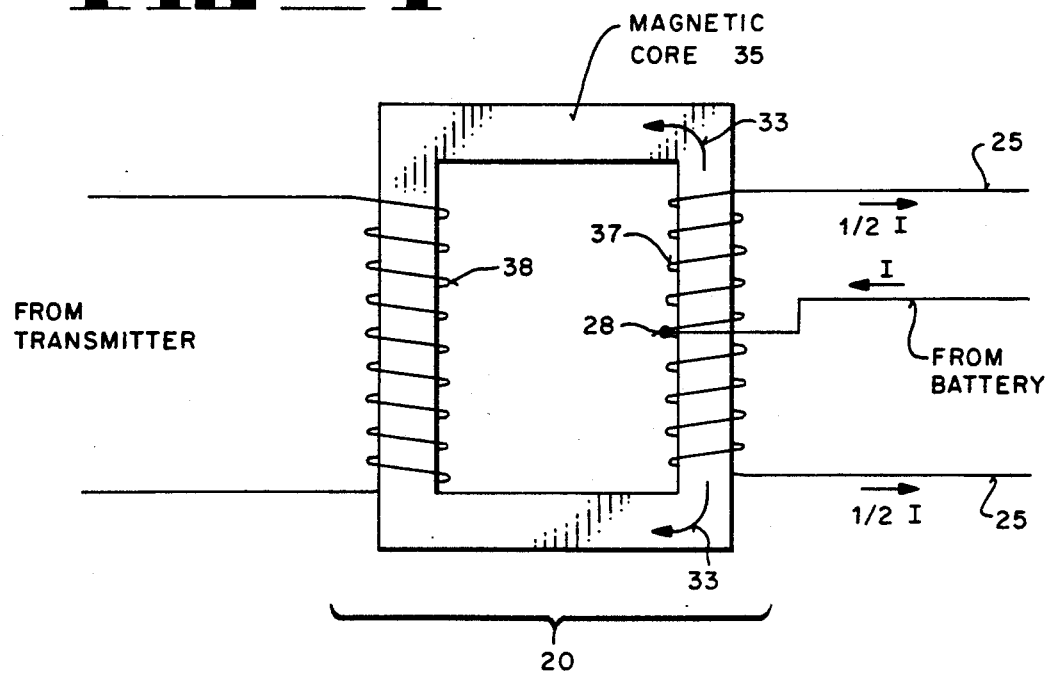
FIG_4

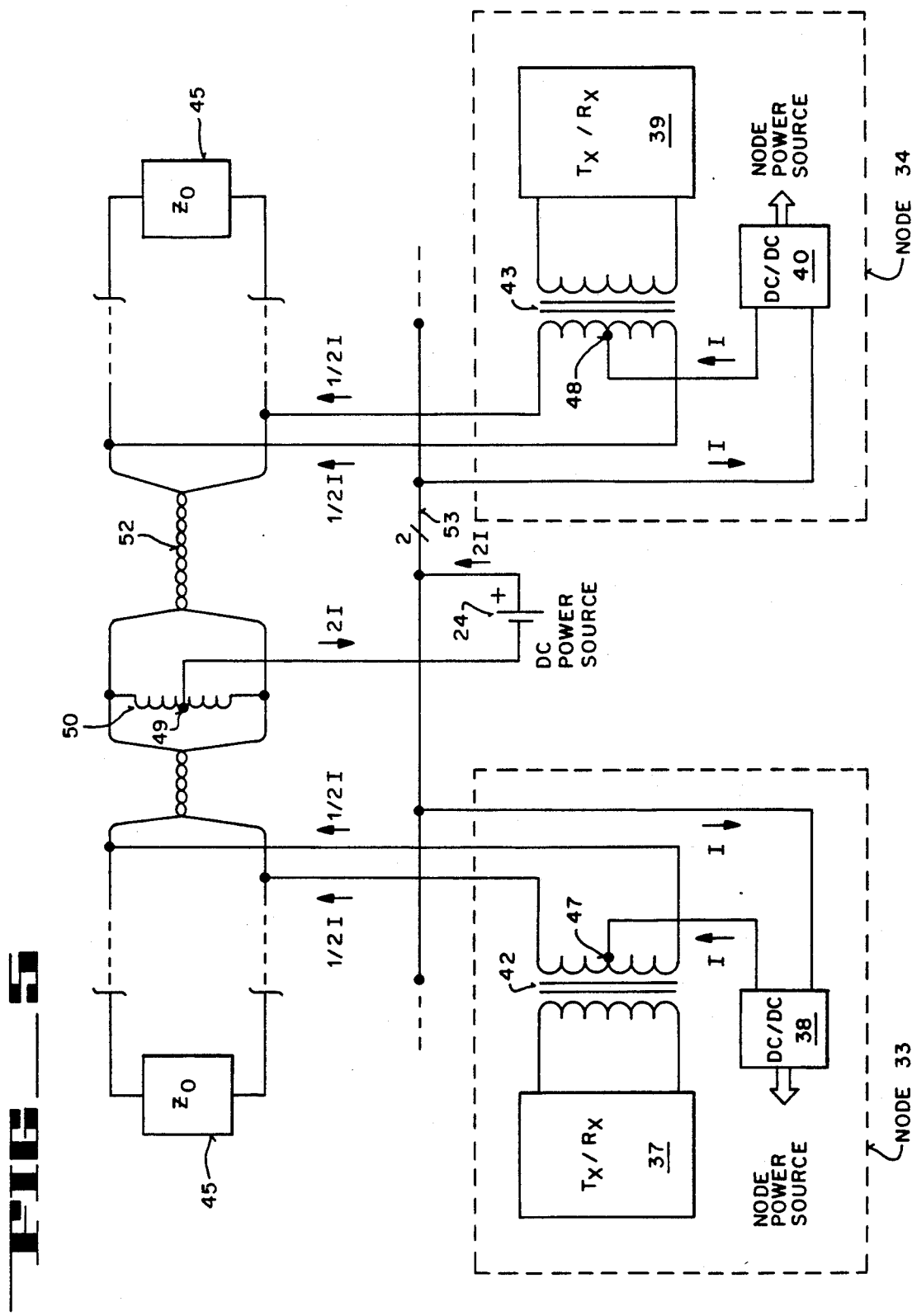
FIG_5

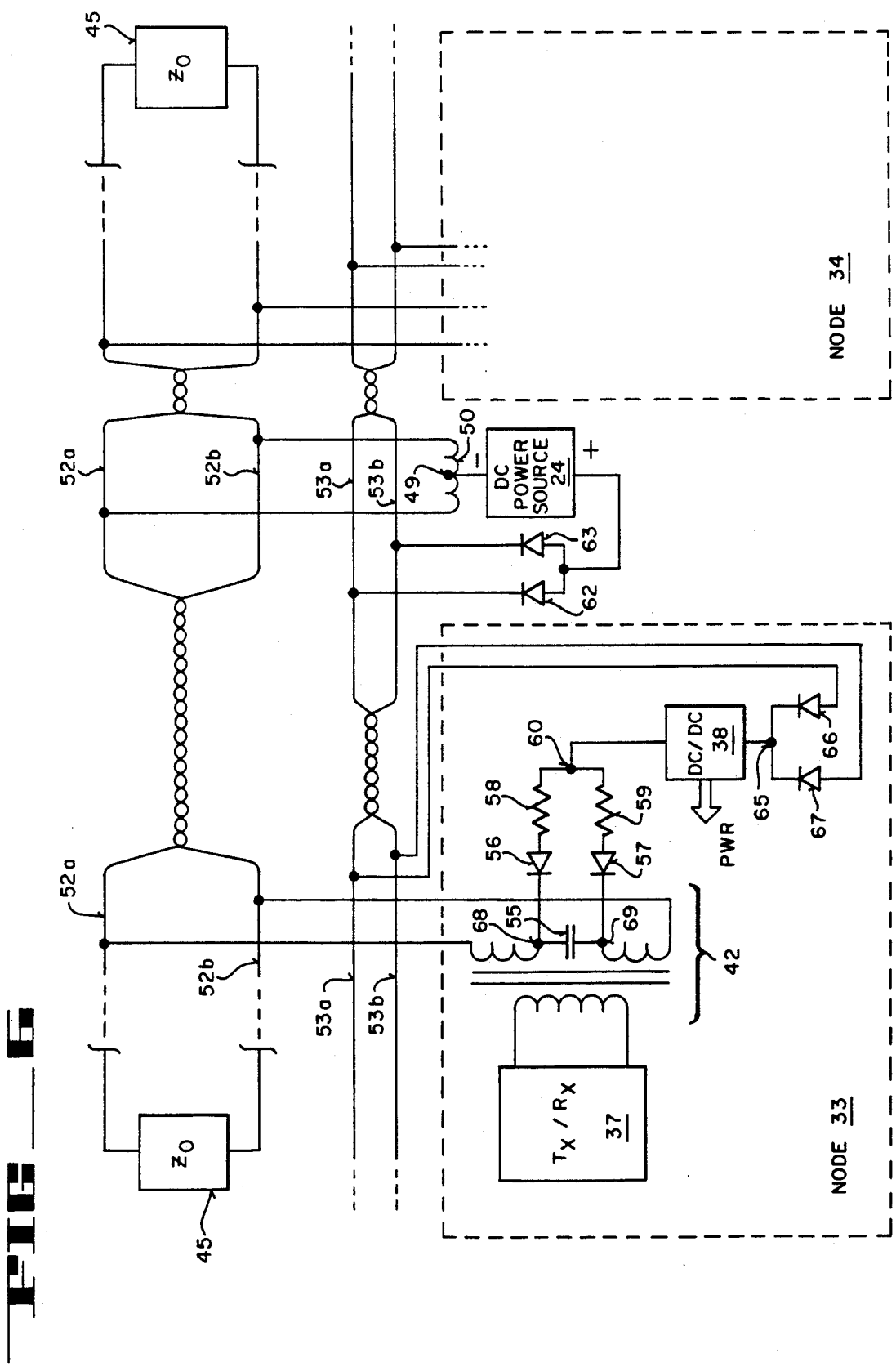
FIG_5

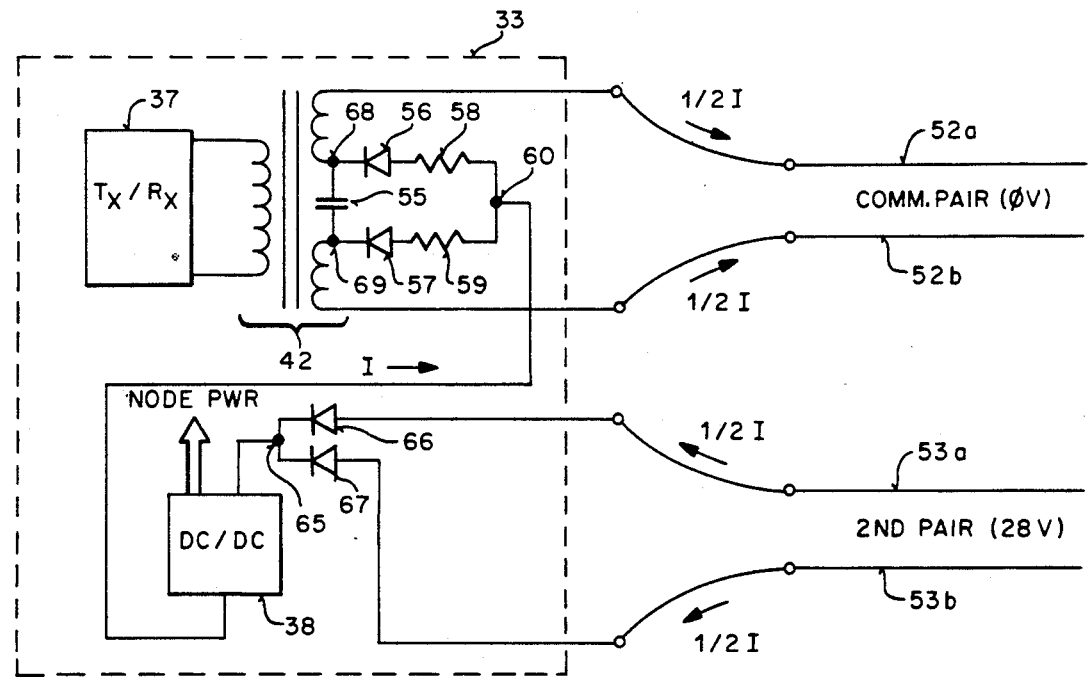
FIG_7A
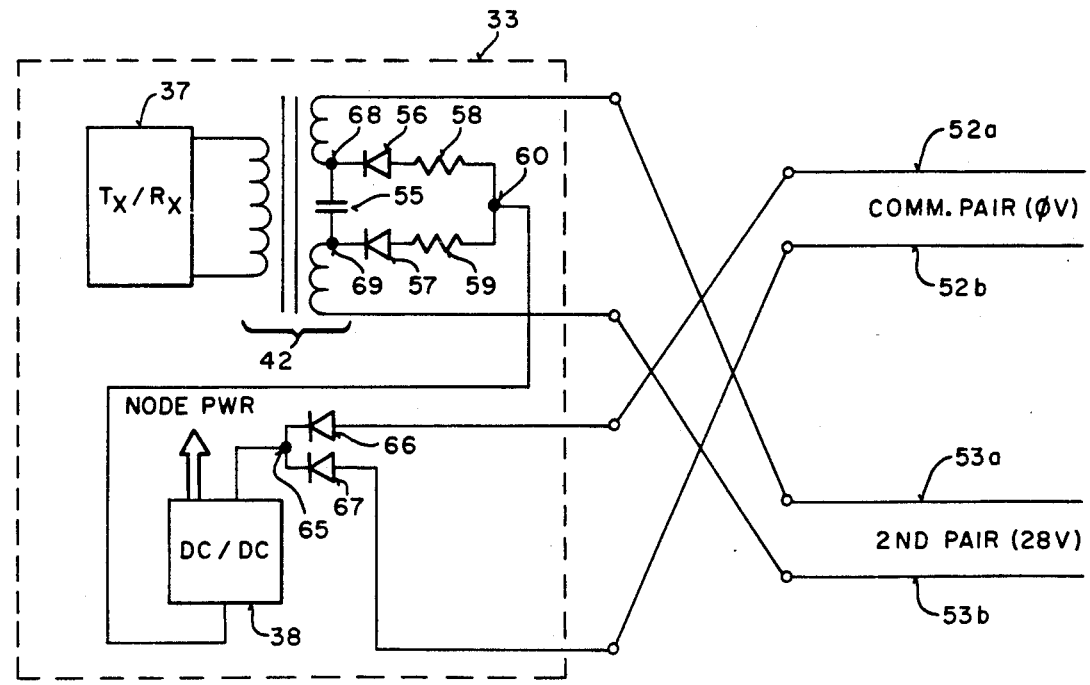
FIG_7B

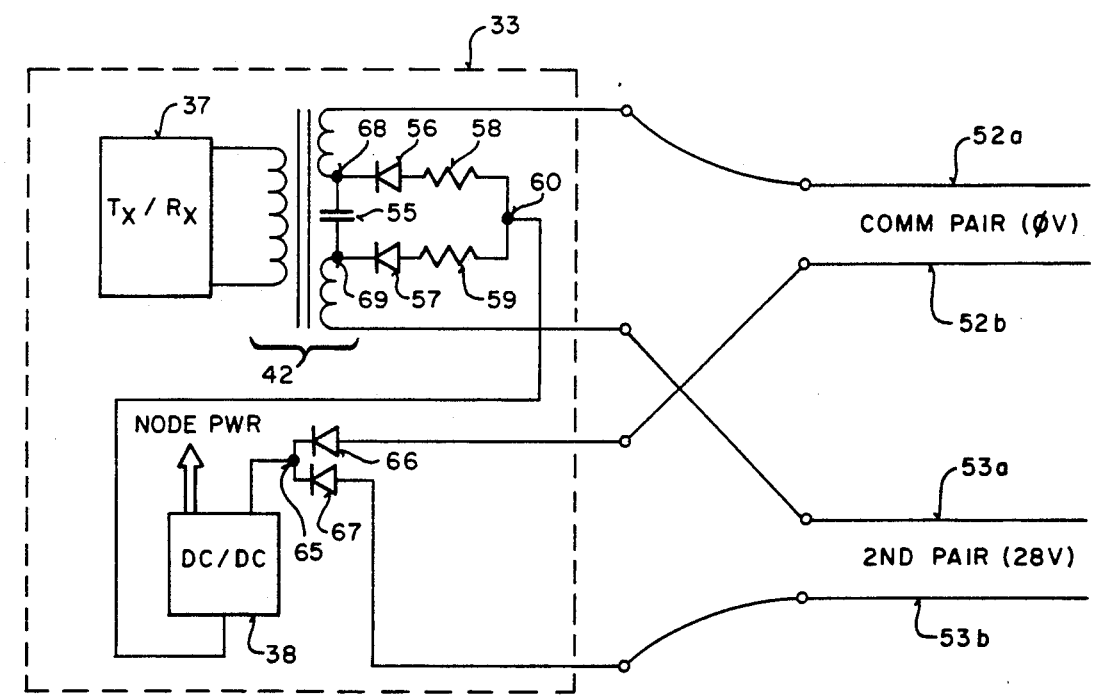
FIG_7C

DATA COMMUNICATION NETWORK PROVIDING POWER AND MESSAGE INFORMATION

FIELD OF THE INVENTION

The invention relates to the field of wired communication systems. More specifically, to communications systems which provide for simultaneous distribution of power and message information along the same cable bundle.

BACKGROUND OF THE INVENTION

The ability to transmit message information and power through the same cable lines has existed for some time. Telephone systems are prime examples of communications systems that transmit power and communications through the same wire bundle. In such a system, problems of interference and signal degradation are avoided by making the message information and power spectral frequencies to be far apart.

By way of example, in a typical telephone system a DC voltage of about 40 volts occupies the low frequency spectral range, while AC communications take place at much higher frequencies (e.g., in the kilohertz range). Various filtering techniques are then used to distinguish the two signals. Basically, this amounts to using a highpass filter to reject the power while detecting the message information, and a lowpass filter to reject the message while extracting the DC power.

Such prior art systems are not without their disadvantages. One major disadvantage of this type of prior art system lies in the fact that the transformer must be sized to handle the DC current without saturating. In general, a transformer which can accommodate DC currents without saturating has much poorer AC characteristics than one in which does not have to handle any DC current. These degraded AC characteristics are manifested by poor communications signal quality and by a limited bandwidth. Hence, the operating performance of the communications network is compromised in this type of conventional communications system.

To overcome the difficulties associated with providing power and communications along the same cable, some practitioners have chosen to provide separate conductors for power and message delivery. However, this approach has also suffers from certain serious drawbacks. For instance, in a multi-drop communication system (e.g., a system providing communications between a plurality of separate nodes) it is often a stringent requirement that the miswiring of a single node not disrupt communications between other nodes connected to the network. In other words, if a particular node is miswired such that one of the power lines has been inadvertently connected to a communications line, or visa versa, then the entire network should not fail. It should be noted that in multi-drop networks having many communications nodes, miswiring of individual nodes is relatively commonplace. Past approaches which separate their respective power and communications lines have failed to adequately safeguard against the eventuality of a miswiring condition.

A further problem of conventional power distribution approaches is that they tend to make inefficient use of cable. That is, the distance between communications nodes is often limited because of DC voltage drops experienced as power is distributed about the network. For a multi-drop system, this problem is particularly troublesome. Because the maximum distance between two given nodes is frequently limited by the DC voltage drop on the power distribution lines—rather than the ability of individual nodes to achieve reliable AC communications—the scope of prior art communications systems has been limited.

Therefore, what is needed is a means of providing power and communications over the same cable network which overcomes the problems described above. As will be seen, the present invention provides a wire-based communications network in which power and message information is delivered over the same cable network with improved AC characteristics. The enhanced communication capabilities of the present invention permit greater communication speeds and transmission over greater distances. In addition, the present invention allows for distribution of power and message information over a greater number of nodes. Moreover, the present invention solves the problem of network failure in the event that a single node is accidentally miswired.

SUMMARY OF THE INVENTION

A data communications system for delivering power and communications over the same cable network is described. One of the primary benefits of the present invention is more than an order of magnitude reduction in the net DC flux present in the core of the transformers associated with the various transmitter/receiver nodes. As a result of this reduction, the AC characteristics of the the transformers may be enhanced, thereby improving the communications capabilities of the network (e.g., greater operating speeds, longer distances between nodes, and a larger number of permissible nodes coupled along the network).

In particular, the present invention realizes a factor of two improvement in the physical distance limitations between communicating nodes due to power distribution considerations. Moreover, the present invention overcomes the problem of a single node miswiring condition disturbing communication between other nodes on the network.

In one embodiment, a plurality of communications nodes are coupled to a single cable. The cable comprises a communications twisted pair wire and a second twisted pair wire. Associated with each of the nodes is a transformer having a core, a primary winding and a secondary winding. The secondary winding has a centertap connection which either splits or merges the current either entering or exiting the secondary winding, depending on the current flow convention being used. The important result is that the net DC flux within the core of the transformer is essentially eliminated.

Each node also includes a transceiver coupled to the primary winding. This provides the means for transmitting/receiving AC messages passed along the communications twisted pair. The transformer also provides isolation from the DC power distributed on the same cable.

Every node also has a means for converting a predetermined DC voltage (e.g., 28 V) to a regulated supply voltage (e.g., 5 V) for use by that node. Basically, the converter means typically comprises an ordinary switched-mode power supply having a first terminal coupled to the centertap of the transformer, and a second terminal coupled to the second twisted pair. The second twisted pair has its respective wires connected together to reduce by half its associated resistance value.

The data communications system further comprises a DC power source which provides the predetermined DC voltage across first and second voltage terminals. The second voltage terminal of the power source is coupled to the second line. Finally, the AC communications pair is coupled to the first voltage terminal of the DC power source again utilizing a centertap connection of a winding. This insures that the current either entering or exiting the first voltage terminal is either merged or split, respectively, in accordance with the above operating principles. To reiterate, whether the current is split of merged depends on the particular polarity of the respective twisted pair wires.

BRIEF DESCRIPTION OF THE DRAWINGS

The novel features believed characteristic of the invention are set forth in the appended claims. The invention itself however, as well as other features and advantages thereof, will be best understood by reference to the description which follows, read in conjunction with the accompanying drawings, wherein:

FIG. 1 is a circuit schematic diagram of a prior art communications network scheme. The circuit of FIG. 1 employs a single twisted pair cable bundle providing message information and power in a point-to-point communications system.

FIG. 2 is a circuit schematic diagram of another prior art scheme for providing communications and power through the same cable bundle.

FIG. 3 is a circuit schematic diagram which illustrates the basic concept of the present invention.

FIG. 4 shows the direction of current flow through the secondary transformer winding in accordance with one embodiment of the present invention.

FIG. 5 is a circuit schematic diagram illustrating one embodiment of the communications network of the present invention.

FIG. 6 is a circuit schematic diagram of the currently preferred embodiment of the present invention.

FIGS. 7A-7C illustrate various miswiring conditions which may occur during the installation of the communications network of the present invention.

DETAILED DESCRIPTION

A data communication system which provides message information and power through the same cable bundle is described. In the following description, numerous specific details are set forth such as circuit elements, connections, circuit configurations, etc., in order to provide a thorough understanding of the invention. It will be obvious, however, to one skilled in the art that these specific details need not be used to practice the present invention. In other instances, well-known structures and methods have not been set forth in detail in order to avoid unnecessarily obscuring the present invention.

Referring to FIG. 1, there is shown a prior art method of providing communications and power along the same twisted pair line 15. This system is similar to those commonly found in ordinary telephone systems wherein a transmitter 11 communicates with a receiver 12 on a point-to-point basis.

At the transmitter side of the system, there is included a transformer 10. Transformer 10 provides isolation between transmitter 11 and the communications and power signals carried along twisted pair line 15. In the secondary coil of transformer 10, there is included a split winding into which a battery 14 has been coupled in series. In turn, the split winding is coupled to twisted pair line 15. At the opposite end, line 15 is connected to a transformer 13 coupled to a receiver 12.

Note that transformer 13 also has a split winding on its line side. However, instead a capacitor 17 is coupled in series with the split winding. Capacitor 17 stores the DC power delivered across line 15 by battery 14. At the same time capacitor 17 appears as a short to the AC communications signal. This will be discussed in more detail shortly.

During normal operation, transformer 10 couples the AC signal generated by transmitter 11 to twisted pair wires 15. It is important to understand that the communications signal has AC characteristics which are at a high frequency relative to the DC power distributed along twisted pair 15. AC communications signals are received by transformer 13, which then couples the signals to receiver 12. By its nature, transformer 13 isolates receiver 12 from the DC power present on twisted pair 15.

Power is delivered from transmitter 11 to receiver 12 across twisted pair 15 by means of battery 14, capacitor 17 and DC/DC converter 18. Battery 14 causes DC current to flow along pair 15. This current eventually charges capacitor 17 to about the same DC potential. DC/DC converter 18, coupled in parallel across capacitor 17, taps the voltage present on capacitor 17 and converts acceptable voltage supply level as required by receiver 12. Basically, each node in the schematic diagram of FIG. 1 can be thought of as simply comprising a high pass and low pass filter components; the low pass filter injects/extracts the power to/from line 15 (via battery 14 and the line side of transformer 10, or the line side of transformer 13 and capacitor 17), while, at the same time, the high pass filter (formed by transformers 10 and 13) rejects the power while passing the message information.

The primary disadvantage of the system of FIG. 1 is that transformer 10 must be sized to handle the DC current generated by battery 14. This DC current gives rise to a net DC flux within the magnetic core of transformer 10. The presence of such a flux mandates that the transformer parameters be adjusted to keep the transformer from saturating. In general, a transformer which must accommodate net DC flux without saturating has significantly worse AC characteristics than one which does not need to handle net DC flux. Hence, the overall performance of the network of FIG. 1 suffers.

In an attempt to overcome the shortcomings of the system of FIG. 1, communications engineers reverted to the relatively straightforward prior art approach of FIG. 2. The circuit of FIG. 2 also includes a transmitter 11 which communicates to a receiver 12 through respective transformers 10 and 13, and across twisted pair cable 15. In addition, the circuit diagram of FIG. 2 further comprises a separate pair of conductors 16 for providing a DC power connection between battery 14 and DC/DC converter 18. Converter 18 is again coupled to provide power to the receiving node.

While this approach effectively solves the problem of net DC flux, it does add a new problem; wiring of the network. Since separate conductors are being relied upon for power and message delivery in the system of FIG. 2, there is now a greater chance that miswiring of a node will occur during installation. This problem is exacerbated in a multi-drop communication system wherein a great number of nodes may be distributed throughout the communications environment (e.g., office, factory, home, etc.). In a multi-drop communication system it is imperative that miswiring of a single node not disrupt communications between other nodes on the network. The prior art circuit diagram of FIG. 2 fails to satisfy this requirement.

Furthermore, neither of the prior art systems discussed above makes efficient use of cable. This means that in a multi-drop system employing either of these two approaches, the maximum distance between nodes may be limited by the DC voltage drop on the power distribution pair-rather than the ability of the respective nodes to achieve reliable communications.

In contrast, FIG. 3 illustrates the data communications network of the present invention wherein message information and power is provided through the same cable bundle without degradation of AC communications across the system. The circuit schematic diagram of FIG. 3 comprises a transmitter 21 and a receiver 22. According to the present invention, AC message information is delivered from transmitter 21 to receiver 22 across twisted pair 25, coupled between respective transformers 20 and 26, at a data transmission rate of at least 1.25 megahertz.

DC power is provided to the receiver node in the following manner. Voltage source 24 (e.g., a battery) provides a DC voltage (e.g., ~28 volts) to a centertap 28 located on the line side of transformer 20. Centertap 28 is optimally located at the midpoint of the secondary winding, for reasons which will be explained shortly. A similar centertap connection 29 is made to the secondary of transformer 26. Centertap 29 is coupled to one terminal of DC/DC converter 23. The other terminal of converter 23 is coupled to the negative terminal of battery 24 along twisted pair 31.

When configured in this way, a current of magnitude I flows from battery 24 into centertap 28. FIG. 4 illustrates how the current is split between the respective upper and lower portions of secondary winding 37 of transformer 20. After entering at node 28, one-half of the total current I flows along each of the wires of pair 25 to transformer 26.

FIG. 4 also illustrates how net DC flux is cancelled within the magnetic core 35 of transformer 20. Using the "right-hand rule", the direction of the DC flux produced by the respective current components within winding 37 is easily computed. The contributions from both the upper and lower halves of winding 37 are shown in FIG. 4 by arrows 37. If centertap 28 is located at the middle of winding 37, then the magnitude of each of these flux contributions will be equal. Because the DC flux contributions are equal and opposite, they cancel each other so that no net DC flux is generated within core 35. The same is true for the other transformers distributed along the network. (Note that primary coil 38 only transmits the AC communications signal; therefore it does not generate any DC flux within core 35.)

As discussed earlier, transformer 26 associated with receiver 22 also includes a centertap 29 on the line side of its secondary winding. The split current flowing down each of the wires of pair 25 is recombined at centertap 29, again, preferably located at the middle of the secondary of transformer 26, such that a current of magnitude I flows into DC/DC converter 23. This same current flows back to battery 24 along twisted pair 31.

DC/DC converter 23 comprises an ordinary "buck-type", switched mode power supply which converts the high, unregulated voltage received from twisted pair 25 down to more appropriate levels. By way of example, DC/DC converter 23 would normally receive the 28 volts present at centertap node 29 (ignoring the IR drop which occurs), and convert that high voltage to a regulated 5 volt level. As 5 volt power supply voltage level is commonly required for operation of most commercial semiconductor chips, such as those which would be powered within the receiver node. Thus, the basic purpose of converter 23 is to take the relatively high voltage present on twisted pair 25, and drop it down to a voltage level suitable for use by the receiving node.

Note that the return path for the DC power loop connection between convertor 23 and power supply 24 is made through twisted pair 31. Functionally, all that is required is a single wire connection which provides a return path for current I. But, the use of twisted pair 31 reduces the resistance of the wires so that an increased distance between nodes can be achieved. The present invention realizes a factor of two improvement in the maximum attainable distance between communications nodes resulting from power distribution considerations.

FIG. 5 shows the communications network of the present invention implemented in a multi-drop system having a plurality of communication nodes. By way of example, nodes 33 and 34 in FIG. 5 may typically comprise intelligent cells which have sensing, communication, and control capabilities. Node 33 is shown including a transceiver 37, a DC/DC converter 38 and a transformer 42. In accordance with the present invention, transformer 42 includes a centertap 47 on its secondary winding. Centertap 47 is coupled to one terminal of converter 38, with the remaining terminal being coupled to twisted pair 53. Likewise, node 34 includes a transceiver 39, transformer 33 and a DC/DC converter 40, which provides the DC power for node 34. Converter 40 has one of its terminals coupled to centertap 48, and the other to twisted pair 53.

FIG. 5 shows twisted pair wires 52 and 53 as having a bus topology to accommodate the multi-drop configuration of the network. In this type of configuration, DC power source 24 has one terminal connected to twisted pair 53 and its other terminal connected to centertap 49 associated with winding 50. Power source 24 is designed to provide all of the DC power requirements for every node within the network of FIG. 5. Alternatively, several power sources may be distributed along the bus, with each source sharing the power requirements of the entire network.

Winding 50 is simply an inductive coil coupled across the respective wires of twisted pair 52. Centertap 49 of winding 50 functions in the same way as centertaps 47 and 48 associated with transformers 42 and 43, respectively. In other words, according to the polarity convention shown, centertap 49 merges the split current flowing along the individual conductors 52. This current is then returned to power source 24. (Note that the polarities shown in FIG. 5 are for illustration purposes only. They may be changed without affecting this performance of the network, or without detracting from the spirit or scope of the present invention.)

It is appreciated that the communications network of FIG. 5 may accommodate a variable number of communications nodes. That is, individual nodes may be added or subtracted to/from the network without adversely affecting the rest of the nodes. To connect a node, the node's secondary windings are simply connected to twisted pair 52 in the manner shown. The available terminal of the node's associated DC/DC converter is then connected to twisted pair 53. Thus, by making these three connections, a node may be placed anywhere along the network. From there it may communicate with any other node while receiving DC power from power source 24.

To avoid signal reflections along twisted pair 52, the respective ends of the network wires are terminated by an impedance $Z_0$, shown in FIG. 5 by element 45. The impedance $Z_0$ is selected to match the characteristic impedance of twisted pair 52. Preferably, elements 45 includes at least one resistor and one capacitor coupled in series—the capacitor being employed to guard against a catastrophic failure in the event that a miswiring condition occurs. How the present invention handles miswiring situations will be discussed in more detail shortly.

The operation of the network of FIG. 5 is similar to that described previously in connection with FIG. 3. AC communication takes place in a straightforward manner between transceivers 37 and 39 at relatively high frequencies (up to 1.25 MHz). These AC communications signals are not interceded by the DC current being supplied to nodes 33 and 34 by power source 24. Consistent with the convention shown in FIG. 5, a DC current I flows into DC/DC converters 38 and 40 from twisted pair 53. From there, the current flows into centertap 47 and 48. At this point, current I is split in half as it travels from transformer 42 and 43 across lines 52 toward winding 50. The respective current components are then recombined at centertap node 49 such that current 2I is returned to power source 24. (One should recognize that the split currents may not be exactly equal; if, for example, communication nodes 33 and 34 consumed different power then the two currents would have different values.)

The currently preferred embodiment of the present invention is illustrated in FIG. 6. The circuit diagram of FIG. 6 is essentially the same as that shown previously in FIG. 5, except that pairs of diode pairs have been added to various portions of the network. These diode pairs provide a means to prevent catastrophic current flow between wires 52 and 53 whenever a miswiring event occurs. The different miswiring conditions which are capable of bringing down the communications link in the absence of the diode pairs will be discussed in conjunction with FIGS. 7A-7C.

As shown in the circuit schematic of FIG. 6, the positive terminal of DC power source 24 is coupled to the anode of diodes 62 and 63. The cathode of diodes 62 and 63 are respectively coupled to lines 53A and 53B. As is clearly seen, the direction of diodes 52 and 53 is such that current flow is only permitted in a direction from power source 24 to lines 53. Considering only node 33, DC current flows from source 24 along lines 53A and 53B, entering the node through diodes 66 and 67, respectively. Again, these diodes are configured so as to permit current flow only in the direction from lines 53 to node 65. Node 65 is coupled to one terminal of DC/DC converter 38. As previously discussed, DC/DC converter 38 converts the relatively high voltage generated by source 24 to a regulated supply voltage to power node 33.

The other terminal of converter 38 is coupled to node 60. In accordance with the previously discussed principles of operation, node 60 splits the DC current as it enters the secondary winding of transformer 42; one-half of the current flowing through resistor 58, diode 56 and then onto line 52A, and the other half flowing through resistor 59, diode 57 and then onto line 52B. As explained earlier in connection with FIG. 4, splitting the current in this manner eliminates net DC flux within transformer 42.

Note that a capacitor 55 has been added across nodes 68 and 69 of the split winding of transformer 42. Capacitor 55 functions to preserve AC data transmission capabilities. Since at high frequencies capacitor 55 acts like a short between nodes 68 and 69, AC message information can be transmitted to/from transceiver 37 and any other node in the network. For DC purposes, capacitor 55 acts like an open circuit.

The split current components flowing on lines 52A and 52B are merged again at centertap 49 associated with winding 50. Centertap 49 is shown being coupled to the negative terminal of DC power source 24.

Resistors 58 and 59 are included in the network configuration of FIG. 6 to prevent transformer 42 from saturating due to any slight imbalance in DC current that might exist in the two halves of the line side of the transformer. Without resistors 58 and 59, transformer and cable matching tolerances may make it possible to have a large enough mismatch in the currents through the split windings that transformer 42 may saturate. Once transformer 42 saturates, it presents a low impedance to twisted pair 52 capable of bringing the entire communications link down. Obviously, the precise value of these resistors may depend upon the particular tolerance parameters associated with transformer 42. Currently, resistors 58 and 59 have a value of about 20 ohms each for an communications network operating at a data rate of 1.25 Mbits/sec. In another embodiment, operating at a reduced data rate of 78 Kbits/sec, no resistors are needed.

FIG. 7A-7C illustrate various wiring conditions which might effect the integrity of the communications network in the absence of diode pairs; specifically pairs 56 and 57, 66 and 67 and 62 and 63. To begin with, FIG. 7A shows the normal wiring connection of communications node 33, wherein twisted pair wires 52A and 52B are coupled through the line side windings of transformer 42 to nodes 68 and 69, respectively. Likewise, the second twisted pair sires 53A and 53B are coupled to diodes 66 and 67, respectively. The other terminal of diode 66 and 67 is coupled to node 65, and connected to DC/DC converter 38.

By way of example, conductors 53A and 53B are shown each delivering one-half of the total DC current I into communications node 33 through respective diodes 66 and 67. The split currents components are combined at node 65, and then are re-split again at node 60. As explained in conjunction with FIG. 6, one-half of the split current flows through resistor 58, diode 56 and onto line 52A, while the other half flows through resistor 59, diode 57 and onto line 52B. Thus, the current flows indicated in FIG. 7A are consistent with the diode configurations, and the network operates properly.

In contrast, FIG. 7B, illustrates a typical miswiring condition in which the presence of diodes 66 and 67 play an important role in preventing disturbance or failure of the entire communications link. In FIG. 7B, communication wires 52A and 52B are shown miswired to diodes 66 and 67, respectively. At the same time, the second pair of wires 53A and 53B are shown coupled to nodes 68 and 69, respectively. In other words, at this particular node the communication pair have been mistakenly wired to the terminals coupled to DC/DC converter 38, while the second twisted pair have been mistakenly wired to the terminals coupled to transformer 42.

In the absence of diodes 66 and 67, the communication pair would be shorted together. This would cause the entire communications link to be brought down. However, because of the rectifying nature of the diode pair, this current flow is prohibited. Notice that in such a miswiring event, one of the diodes (either 66 or 67) always presents a reversed-bias junction (e.g., its cathode) thereby stopping current flow in that direction. This arises from the back-to-back fashion in which the diodes are connected across the communication twisted pair. This means that for the miswiring condition of FIG. 7B the communications node always ends up presenting a high impedance to the rest of the network. Hence, the communication pair is unloaded so that other nodes in the system may continue to function even though the particular node (e.g., node 33) remains dysfunctional.

Another possible miswiring condition which—if it were not for the presence of diodes 56, 57 or 66, 67—would cause the communication link to fail is illustrated in the schematic diagram of FIG. 7C. In FIG. 7C, line 53A is shown incorrectly connected to node 69 while line 53B is shown connected correctly to diode 67. Likewise, line 52B is shown misconnected to diode 66 while line 52A is correctly connected to node 68.

It should be apparent from the drawing that without diodes 56 and 57 there would be a natural current flow from wire 53A to wire 52A. This would cause transformer 42 to saturate, due to the large DC current flowing through its secondary winding. The end result would be that the DC power supply would be shorted, rendering it unusable throughout the entire network. The diode pair 56 and 57 incorporated into node 33 prevents this situation from ever occurring.

Referring back to FIG. 6, diodes 62 and 63 have been included in the miswiring considerations. That is, in the event that DC power source 24 is accidentally miswired (e.g., if one of lines 53 is miswired with one of lines 52) then supply 24 simply looks like a high impedance to the communications twisted pair 52. This is a result of the reversed-biased nature of diode 62 and 63 for such a miswiring condition. Note that the inclusion of diodes 62 and 63 is particularly important in a mixed-type of network wherein some of the nodes are powered from DC power source 24, and others rely upon a local AC power supply source. If DC power supply 24 is inadvertently miswired, then the local AC powered nodes should not be affected. In accordance with the embodiment of FIG. 6, diodes 62 and 63 prevent such a miswiring of the DC power source from affecting those nodes which rely on local AC power.

What is claimed is:

1. A data communication system for delivering power and message information from a transmitter to a receiver, said system comprising:
    first and second transformers coupled to said transmitter and receiver, respectively, each of said transformers having a centertap connection to its secondary winding;
    DC voltage supply means for producing a predetermined potential, said supply means having a first voltage terminal coupled to said centertap connection associated with said first transformer, and a second voltage terminal;
    a first cable coupling said first and said second transformers to each other, thereby providing an AC communications path;
    means for converting said predetermined potential to a regulated supply voltage for use by said receiver, said converter means being coupled to said centertap connection associated with said second transformer;
    a second cable coupling said second voltage terminal of said supply means to said converter means, thereby providing a path for DC current to flow through said first and second cables, said DC current being divided within said secondary windings such that the net DC flux present within said transformers is substantially eliminated.

2. The system of claim 1 wherein said first cable comprises a first twisted pair wire.

3. The system of claim 2 wherein said second cable comprises a second twisted pair wire.

4. The system of claim 2 wherein said converter means comprises a switched-mode power supply.

5. The system of claim 4 wherein said DC voltage supply means comprises a battery.

6. The system of claim 5 wherein said predetermined potential is approximately 28 volts.

7. The system of claim 5 wherein said regulated supply voltage is approximately 5 volts.

8. A data communications network for distributing power and for providing message passing capabilities among a plurality of communications nodes coupled to a cable comprising a communications twisted pair and a second line, each of said nodes including:
    a transformer having a core, a primary winding and a secondary winding,
    said secondary winding having an associated centertap connection means for splitting/merging the current entering/exiting said secondary winding such that net DC flux within said core is substantially reduced;
    a transceiver coupled to said primary winding;
    a means for converting a predetermined DC voltage to a regulated voltage for use by an individual node, said converter means having a first terminal coupled to said centertap connection means, and a second terminal coupled to said second line;
    said network further comprising:
    a DC power source providing said predetermined DC voltage across first and second voltage terminals, said second voltage terminal being coupled to said second line; and
    connection means coupled to said communication pair for splitting/merging the current exiting/entering said first voltage terminal.

9. The network of claim 8 wherein said second line comprises a second twisted pair.

10. The network of claim 8 wherein said centertap connection means comprises a means for preventing network failure in the event a single node is miswired to said cable.

11. The network of claim 10 wherein said prevention means comprises a pair of diodes connected to the respective lines of said communication pair.

12. The network of claim 11 further comprising an additional diode means coupled to said second voltage terminal for preventing network failure in the event said DC power source is miswired to said cable.

13. The network of claim 12 wherein said communications pair is terminated in an impedance matched to the characteristic impedance of said pair.

14. The network of claim 13 wherein said impedance comprises a capacitor coupled in series between said respective lines, said capacitor also preventing network failure in the event said DC power source is miswired to said cable.

* * * * *